US011880149B2

(12) United States Patent
Ito et al.

(10) Patent No.: US 11,880,149 B2
(45) Date of Patent: Jan. 23, 2024

(54) IMAGING SYSTEM WITH COLLECTING DEVICE FOR FUSER AND CONTROLLER FOR IMAGING SYSTEM

(71) Applicant: HEWLETT-PACKARD DEVELOPMENT COMPANY, L.P., Spring, TX (US)

(72) Inventors: Takuya Ito, Yokohama (JP); Takashi Nakazawa, Yokohama (JP); Yuji Aoshima, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/909,514

(22) PCT Filed: Feb. 5, 2021

(86) PCT No.: PCT/US2021/016739
§ 371 (c)(1),
(2) Date: Sep. 6, 2022

(87) PCT Pub. No.: WO2021/183237
PCT Pub. Date: Sep. 16, 2021

(65) Prior Publication Data

US 2023/0115505 A1 Apr. 13, 2023

(30) Foreign Application Priority Data

Mar. 13, 2020 (JP) ................................ 2020-043953

(51) Int. Cl.
*G03G 15/20* (2006.01)
*G03G 21/00* (2006.01)
(Continued)

(52) U.S. Cl.
CPC ......... *G03G 15/2017* (2013.01); *G03G 21/10* (2013.01); *G03G 21/206* (2013.01);
(Continued)

(58) Field of Classification Search
CPC .. G03G 15/2017; G03G 21/10; G03G 21/206; G03G 2221/1645
(Continued)

(56) References Cited

U.S. PATENT DOCUMENTS 8,995,869 B2 3/2015 Park et al.
10,241,463 B2 3/2019 Yabuki et al.
(Continued)

FOREIGN PATENT DOCUMENTS

JP 2007-290577 A 11/2007
JP 2017-015802 A 1/2017
(Continued)

*Primary Examiner* — Robert B Beatty
(74) *Attorney, Agent, or Firm* — Brooks, Cameron & Huebsch, PLLC

(57) ABSTRACT

An imaging system includes a housing that defines a housing space, a fuser disposed inside the housing space to fix a toner image onto a print medium, a collecting device including an ionizer and a particle filter, and a controller. The fuser is associated with operation history information. The ionizer of the collecting device includes a first electrode and a second electrode. The ionizer generates a discharge between the first electrode and the second electrode so as to charge floating particles that are discharged from the fuser. The particle filter of the collecting device collects the charged floating particles. The controller controls a current to flow between the first electrode and the second electrode due to the discharging, based on the operation history information of the fuser.

14 Claims, 10 Drawing Sheets

(51) Int. Cl.
*G03G 21/10* (2006.01)
*G03G 21/20* (2006.01)

(52) U.S. Cl.
CPC ............. *G03G 2215/00687* (2013.01); *G03G 2221/0005* (2013.01); *G03G 2221/1645* (2013.01)

(58) Field of Classification Search
USPC ............................................... 399/92, 93, 99
See application file for complete search history.

(56) References Cited

U.S. PATENT DOCUMENTS

| | | | | |
|---|---|---|---|---|
| 2013/0243471 | A1* | 9/2013 | Ikeda ................... | G03G 21/206 399/93 |
| 2013/0265717 | A1 | 10/2013 | Watts | |
| 2015/0030341 | A1 | 1/2015 | Uchiyama et al. | |
| 2019/0278222 | A1* | 9/2019 | Ishikawa ............ | G03G 15/2064 |
| 2021/0063962 | A1* | 3/2021 | Nakazawa ................ | B03C 3/08 |
| 2022/0137540 | A1* | 5/2022 | Ito ............................. | B03C 3/12 399/69 |

FOREIGN PATENT DOCUMENTS

| | | | | |
|---|---|---|---|---|
| KR | 10-2010-0090960 A | | 8/2010 | |
| WO | WO-2020033105 A1 | * | 2/2020 | ............. B03C 3/017 |

* cited by examiner

FIG.7

| NUMBER OF FLOATING PARTICLES | APPLICATION CURRENT VALUE [μA] | CHARGE AMOUNT [NUMBER/cc] |
|---|---|---|
| 0 | 0 | 0 |
| 1 | 0 | 0 |
| 2 | 7.5 | 4643 |
| 3 | 7.5 | 4643 |
| 4 | 7.5 | 4643 |
| 5 | 15 | 10198 |
| 6 | 15 | 10198 |
| 7 | 15 | 10198 |
| 8 | 15 | 10198 |
| 9 | 15 | 10198 |
| 10 | 15 | 10198 |
| 11 | 60 | 49209 |
| 12 | 60 | 49209 |
| 13 | 60 | 49209 |
| 14 | 60 | 49209 |
| 15 | 60 | 49209 |
| 16 | 60 | 49209 |
| 17 | 60 | 49209 |
| 18 | 60 | 49209 |
| 19 | 60 | 49209 |
| 20 | 60 | 49209 |

IMAGING SYSTEM WITH COLLECTING DEVICE FOR FUSER AND CONTROLLER FOR IMAGING SYSTEM

BACKGROUND

Some imaging apparatuses include a conveying device which conveys a print medium, an image carrier on which an electrostatic latent image is formed, a developing device which develops the electrostatic latent image into a toner image, a transfer device that transfers the toner image onto the print medium, a fuser which fixes the toner image onto the print medium, and a discharge device which discharges the print medium.

BRIEF DESCRIPTION OF DRAWINGS

FIG. 7 is an example reference table listing numbers of floating particles in association with a current applied to an ionizer.

DETAILED DESCRIPTION

Hereinafter, an example imaging system will be described with reference to the drawings. The imaging system may be, in some examples, an imaging apparatus such as a printer. In some examples, the imaging system may be a component constituting an imaging apparatus, such as a developing device or the like used as a part of a printer. In the following description, with reference to the drawings, the same reference numbers are assigned to the same components or to similar components having the same function, and overlapping description is omitted.

Figure 1:
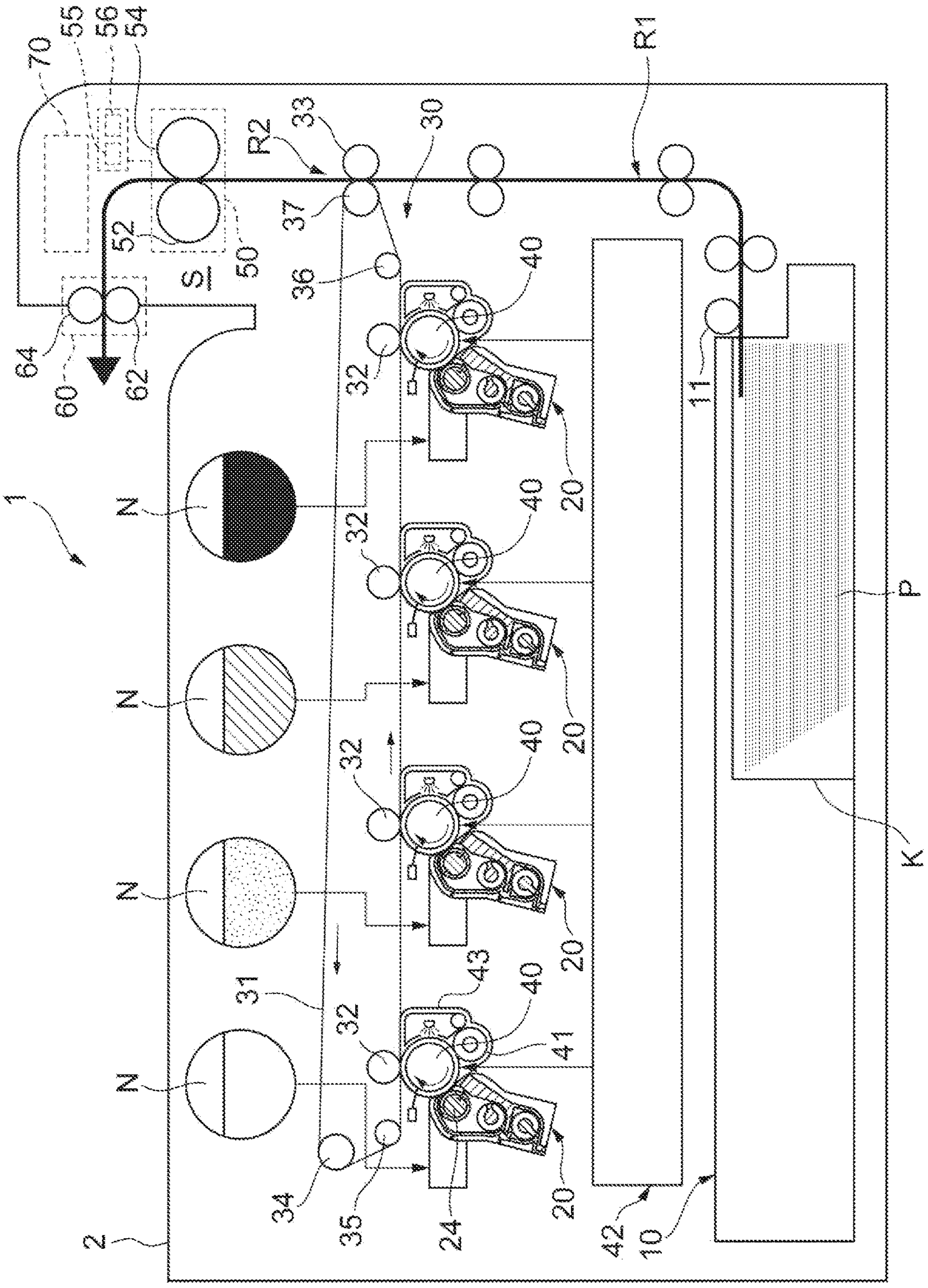
FIG. 1 is a schematic diagram of an example imaging apparatus.

With reference to FIG. 1, an example imaging apparatus 1 may form a color image by using toners of respective colors of magenta, yellow, cyan, and black. The imaging apparatus 1 may include a housing 2 which defines a housing space S, a conveying device 10 which conveys a print medium P, a developing device 20 which develops an electrostatic latent image into a toner image, a transfer device 30 which transfers the toner image onto the print medium P, an image carrier 40 (e.g., an electrostatic latent image carrier or a photosensitive drum) on which an electrostatic latent image is formed, a fuser (or fixing device) 50 which fixes the toner image to the print medium P, and a discharge device 60 which discharges the print medium P. The conveying device 10, the developing device 20, the transfer device 30, the image carrier 40, the fuser 50, and the discharge device 60 are housed in the housing space S. The developing device 20 may refer to one or more developing devices 20, and the image carrier 40 may refer to one or more image carriers 40. For example, the example imaging apparatus 1 includes four developing devices 20 associated with the four toner colors of magenta, yellow, cyan, and black. Similarly, the example imaging apparatus 1 includes four image carriers 40 associated with the four toner colors, that are positioned adjacent the four developing devices 20, respectively.

The conveying device 10 may convey the print medium P, such as a sheet of paper, on which an image is to be formed along a conveying route R1. The print media P may be accommodated in a cassette K in a stacked state and may be picked up and conveyed by a feeding roller 11. The conveying device 10 directs the print medium P to reach a secondary transfer area R2 through the conveying route R1, for example, at a timing in which a toner image to be transferred onto the print medium P reaches the secondary transfer area R2.

Four developing devices 20 are provided for the respective colors, for example. Each developing device 20 may include a developer carrier 24 which transfers a toner to the associated image carrier 40. Accordingly, the example imaging apparatus 1 includes four developer carriers 24 in association with the four developing devices and the four toner colors. The developer carrier 24 may refer to one or more developer carriers 24 in the present disclosure. In each developing device 20, a two-component developer including a toner and a carrier may be used as a developer. The toner and the carrier are mixed and adjusted to be a targeted mixing ratio so that the toner is dispersed. Accordingly, the developer may be adjusted to achieve an optimal or targeted charge. This developer is carried on the developer carrier 24. The developer carrier 24 rotates so that the developer is conveyed to an area facing the image carrier 40, where the toner in the developer carried on the developer carrier 24 is transferred to an electrostatic latent image formed on the peripheral surface of the image carrier 40 so that the electrostatic latent image is developed.

The transfer device 30 may convey, the toner images developed by each of the four developing devices 20 to the secondary transfer area R2. The transfer device 30 includes, for example, a transfer belt 31 onto which the toner images are transferred from the image carriers 40, suspending rollers 34, 35, 36, and 37 on which the transfer belt 31 is suspended (or supported), four primary transfer rollers 32 located adjacent the respective image carriers 40, so that each primary transfer roller 32 positions the transfer belt 31 between primary transfer roller 32 and the adjacent image carrier 40, and a secondary transfer roller 33 located adjacent the suspending roller 37 to position the transfer belt 31 between the secondary transfer roller 33 and the suspending roller 37.

The transfer belt 31 may be an endless belt which moves in a circulating manner by the suspending rollers 34, 35, 36, and 37. Each of the suspending rollers 34, 35, 36, and 37 is rotatable around a corresponding rotation axis. The suspending roller 37 may be a drive roller that is rotationally driven. The suspending rollers 34, 35, and 36 may be driven rollers which rotate in a following manner in accordance with the rotational driving of the suspending roller 37, as a drive roller. The primary transfer roller 32 may press against the associated image carrier 40 from the inner peripheral side of the transfer belt 31. The secondary transfer roller 33 may extend in parallel to the suspending roller 37, with the transfer belt 31 interposed therebetween, so as to press against the suspending roller 37 from the outer peripheral side of the transfer belt 31. Accordingly, the secondary transfer roller 33 forms the secondary transfer area R2 which is a transfer nip portion between the secondary transfer roller and the transfer belt 31.

The image carrier 40 may be an electrostatic latent image carrier or a photosensitive drum. Four image carriers 40 may be provided for the four respective colors of toner. The image carriers 40 may be spaced apart along the movement direction of the transfer belt 31. In some examples, each image carrier 40 is associated with one of the developing devices 20, a charging roller 41, an exposure unit (or exposure device) 42, and a cleaning device 43 located adjacent (e.g., in a peripheral region of) the image carrier 40. Accordingly, the charging roller 41, may refer to one or more charging rollers 41, and the cleaning device 43 may refer to one or more cleaning devices 43. The example imaging apparatus 1 includes four charging rollers 41 and four cleaning devices 43, in association with the four image carriers 40, and one exposure unit 42 located adjacent the four image carriers 40.

The charging roller 41 may charge the surface of the image carrier 40 to a predetermined potential. The charging roller 41 may move in accordance with the rotation of the image carrier 40. The exposure unit 42 may expose the surface of the image carrier 40 charged by the charging roller 41 in accordance with an image to be formed on the print medium P. Accordingly, a potential of a portion exposed by the exposure unit 42 in the surface of the image carrier 40 changes so that the electrostatic latent image is formed. For example, four developing devices 20 generate the toner image by developing the electrostatic latent image using the toner supplied from respective toner tanks N that may be located in alignment (for example, to face) the respective developing device 20. Accordingly, the example imaging apparatus 1 includes four toner tanks N that are respectively filled with, for example, magenta, yellow, cyan, and black toners. The cleaning device 43 collects the toner remaining on the image carrier 40, for example, after the toner image formed on the image carrier 40 is primarily transferred onto the transfer belt 31.

The fuser 50 may fuse or fix the toner image, subsequent to the secondary transfer, to the print medium P by conveying the print medium P to pass through a fixing nip portion for heating and pressing the print medium. The fuser 50 includes, for example, a heating roller 52 which heats the print medium P and a pressing roller 54 which rotates in a driving manner while pressing the heating roller 52.

The heating roller 52 and the pressing roller 54 may each have a substantially cylindrical shape, and the heating roller 52 may include a heat source therein such as a halogen lamp for example. A fixing nip portion which is a contact area formed between the heating roller 52 and the pressing roller 54. The toner image may be fused to the print medium P when the print medium P passes through the fixing nip portion. The fuser 50 is operated by receiving electric energy from a power supply. The example imaging apparatus 1 may include an energy measuring unit (or power measurement device) 55 which measures cumulative power supplied to the fuser 50. Further, the imaging apparatus 1 may include a temperature measuring unit (or temperature measurement device, or thermometer) 56 which measures a temperature of the fuser 50.

The discharge device 60 may include discharge rollers 62 and 64 that discharge the print medium P to which the toner image is fixed by the fuser 50 to the outside of the apparatus.

An example printing process carried out by the example imaging apparatus 1 will be described. When a print signal of a target image to be printed, is input to the imaging apparatus 1, a control unit (or controller) of the imaging apparatus 1 actuates the feeding roller 11 to rotate so that the print media P stacked on the cassette K are picked up and conveyed. In a charging operation, the charging roller 41 charges the surface of the image carrier 40 to a predetermined potential. In an exposing operation, the exposure unit 42 irradiates the surface of the image carrier 40 with a laser beam in accordance with the print signal received, so that the electrostatic latent image is formed.

In a developing operation, the developing device 20 develops the electrostatic latent image so that the toner image (e.g., a single color toner image) is formed on the image carrier 40. In a transfer operation, the toner image formed in this way is primarily transferred from the image carrier 40 to the transfer belt 31 at an area where the image carrier 40 faces the transfer belt 31. The toner images formed on the four image carriers 40 are sequentially layered on the transfer belt 31 so that a single composite toner image is formed. Then, the composite toner image is secondarily transferred to the print medium P conveyed from the conveying device 10 in the secondary transfer area R2 where the suspending roller 37 faces the secondary transfer roller 33.

The print medium P to which the composite toner image has been transferred, is conveyed to the fuser 50. In a fixing operation, the fuser 50 fuses (or fixes) the composite toner image to the print medium P by heating and pressing the print medium P between the heating roller 52 and the pressing roller 54 when the print medium P passes through the fixing nip portion. Then, the print medium P is discharged to the outside of the imaging apparatus 1 by the discharge rollers 62 and 64.

With reference to FIG. 1, the example imaging apparatus 1 additionally includes a collecting device (or collection device) 70. In some examples, the collecting device 70 is disposed in the vicinity of the fuser 50 inside the housing 2 and collects floating particles 5 floating inside the housing 2 (cf. FIG. 2). The floating particles 5 may have a size of about 50 nm to 300 nm and may also be referred to as Ultrafine Particle (UFP). The floating particles 5 may be generated from, the toner heated by the fuser 50, the sheet, the components of the fuser 50, or the other peripheral components. The collecting device 70 may be located adjacent the fuser 50, to more efficiently collect the floating particles 5 generated by the fuser 50.

Figure 2:
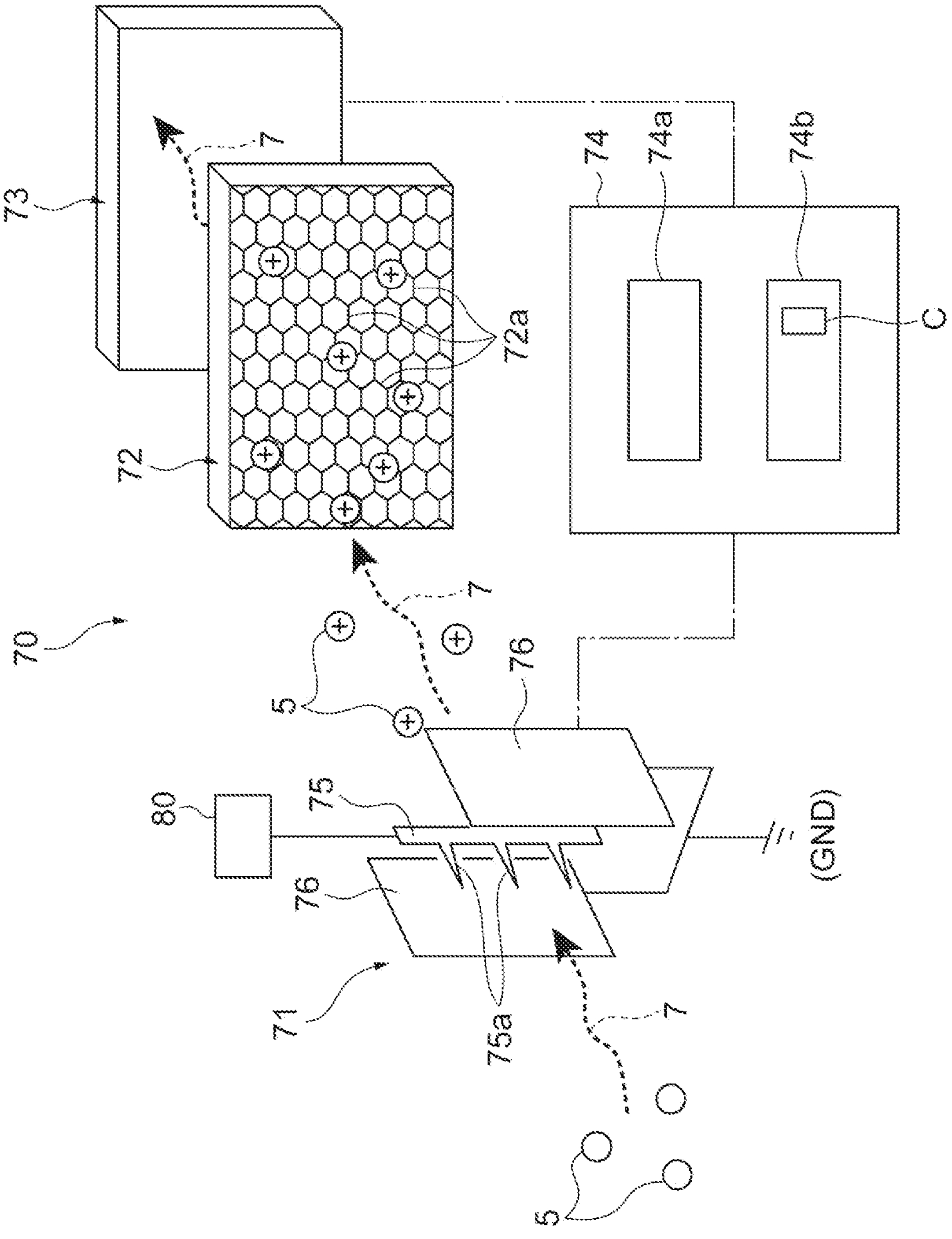
FIG. 2 is a perspective view of an example collecting device including an ionizer.

FIG. 2 is a diagram illustrating an example collecting device 70. The example collecting device 70 is an electrostatic dust collector and includes an ionizer 71, a particle filter 72, an exhaust fan 73, and a controller 74. The ionizer 71 includes a first electrode 75 and a second electrode 76. The ionizer 71 discharges charges generated by the discharge between the first electrode 75 and the second electrode 76. The first electrode 75 and the second electrode 76 may be formed of stainless steel.

A high voltage is applied from a power supply 80 to the first electrode 75. The first electrode 75 includes a plurality of protrusions 75*a* for discharging. The plurality of protrusions 75*a* are arranged, for example, at the equal distance intervals. The protrusion 75*a* may have a saw blade shape or a needle shape, for example. The pair of second electrodes 76 are electrically grounded and are disposed so as to face one another. The first electrode 75 is disposed between the pair of second electrodes 76. The ionizer 71 may have any suitable configuration other than the example illustrated in FIG. 2.

In the ionizer 71, when a voltage applied to the first electrode 75 is less than a predetermined value, no current flows between the first electrode 75 and the second electrode 76. When a voltage applied to the first electrode 75 is a predetermined value or more, for example exceeding a threshold value, a discharge phenomenon occurs and a current flows between the first electrode 75 and the second electrode 76. Accordingly, charges are discharged to the housing space S so that the floating particles 5 passing between the first electrode 75 and the second electrode 76 are charged. As the voltage applied to the first electrode 75 increases, a discharge (current) generated between the first electrode 75 and the second electrode 76 increases so that the amount of charges discharged to the housing space S increases.

The ionizer 71 may be electrically connected to the controller 74 which controls the ionizer 71. For example, the magnitude of the voltage applied to the first electrode 75 may be controlled by the controller 74, via a control signal. The controller 74 may control the amount of the current (hereinafter, also referred to as the "application current") flowing between the first electrode 75 and the second electrode 76 by controlling the power supply 80, for example. For example, the controller 74 may control the magnitude of the voltage applied to the first electrode 75 so that the application current flowing between the first electrode 75 and the second electrode 76 reaches a target current amount. In some examples, the controller 74 controls the magnitude of the current flowing between the first electrode 75 and the second electrode 76 by changing the duty ratio (e.g., a duty cycle ratio) of the Pulse-width modulation (PWM) signal input to the power supply 80.

In the ionizer 71, the tip of the first electrode 75 may deteriorate with use. When the tip deteriorates, the amount of the current flowing between the first electrode 75 and the second electrode 76 changes even when the voltage application amount is the same. In some examples, the amount of the current flowing between the first electrode 75 and the second electrode 76 may be controlled in order to prevent a variation in the current amount even when the tip of the first electrode 75 deteriorates.

The particle filter 72 may include a laminate of polymer sheets subjected to an electret process and may include a plurality of tubular ventilation passages 72*a*. The surface of the particle filter 72 is semi-permanently charged. As a result, the particle filter 72 can collect the floating particles 5 charged by the ionizer 71. For example, the particle filter 72 may collect the floating particles 5 by Coulomb force even if the eyes are coarse.

The electret process may be a process in which a polymer material heated and melted is solidified while applying a high voltage thereto so that the polymer material has a structure that holds charge. The particle filter 72 may have, for example, a honeycomb structure as shown in FIG. 2. According to other examples, the particle filter may have a corrugated structure.

The exhaust fan 73 may include an airflow generation unit (or device) that generates an air flow 7 that carries the floating particles 5. For example, the exhaust fan 73 may allow air to flow to the outside of the housing 2 and may be disposed inside the opening formed in the housing 2. In some examples, the ionizer 71 and the particle filter 72 are disposed between the exhaust fan 73 and the fuser 50. The particle filter 72 may be positioned between the exhaust fan 73 and the ionizer 71. The exhaust fan 73 generates the air flow 7 so that the floating particles 5 charged by the ionizer 71 is transferred to the particle filter 72.

The controller 74 is electrically connected to the ionizer 71 and controls the operation of the ionizer 71. For example, the controller 74 may control the magnitude of the voltage applied to the first electrode 75 and may control the operation of the exhaust fan 73. The controller 74 is, for example, a computer which includes a processor 74*a* such as a Central Processing Unit (CPU) and a storage unit (or storage device) 74*b* such as a Read Only Memory (ROM) or a Random Access Memory (RAM).

The storage unit 74*b* of the controller 74 may be a non-temporary computer-readable storage device that stores processor-readable data and instructions C to operate the imaging apparatus 1. For example, the controller 74 may control the current applied to the ionizer 71 by reading the data and instruction C from the storage unit 74*b* and executing the same C in the processor 74*a*.

In some examples, the controller 74 obtains the estimated number of the floating particles 5 inside the housing space S based on the operation history information of the fuser 50 and determines the amount of charges to be discharged by the collecting device 70 based on the estimated number of the floating particles 5.

Figure 3:
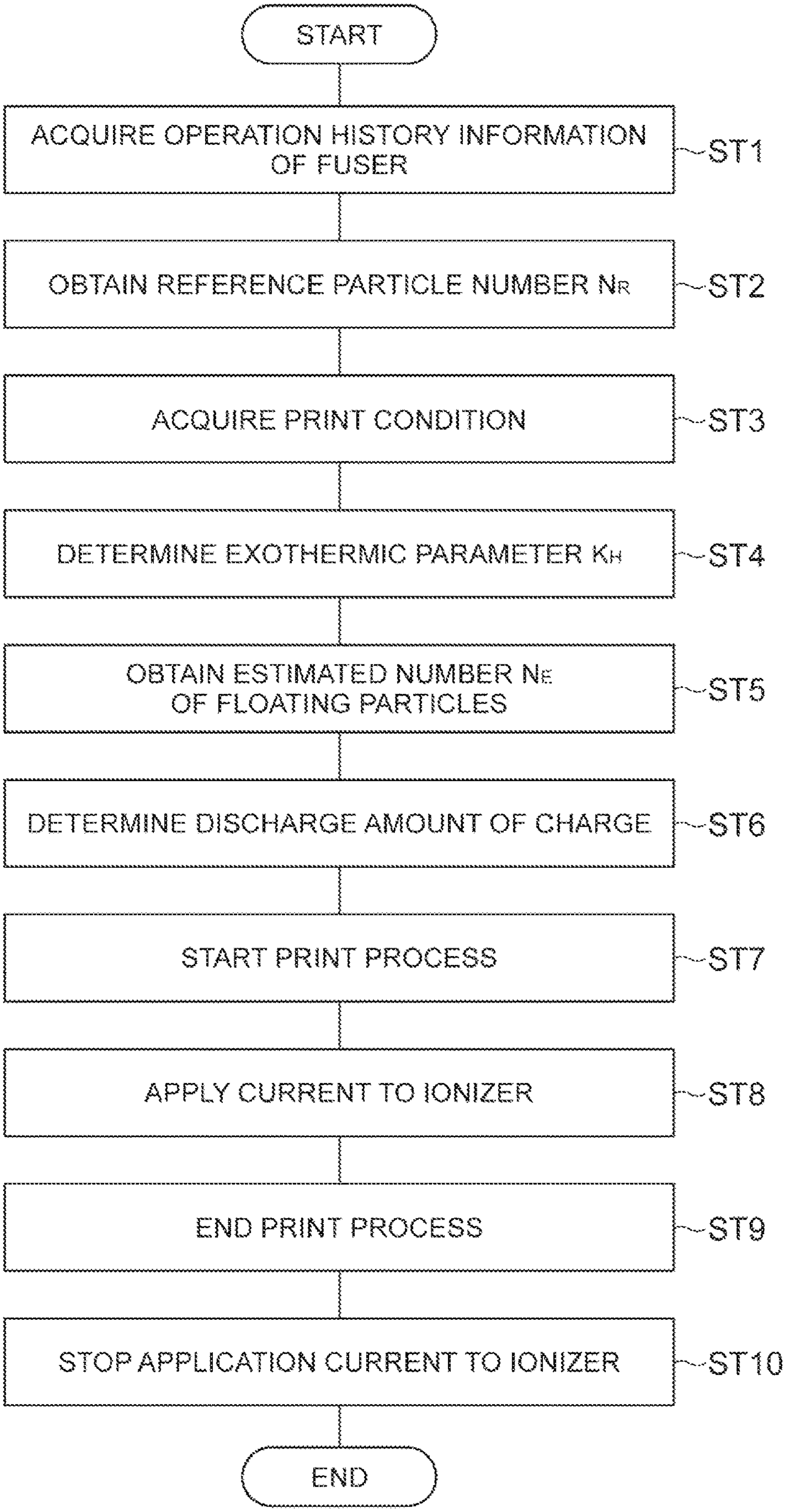
FIG. 3 is a flowchart showing of an example process to be executed by a controller.

Referring to FIG. 3, an example process executed by the controller 74 will be described.

At operation ST1, the controller 74 acquires the operation history information of the fuser 50 from the storage unit 74*b* of the controller 74. The operation history information be indicative of the operation history of the fuser 50 and may include, for example, the cumulative number n of the print medium P subjected to the fixing process by the fuser 50. The cumulative number n of the print medium P subjected to the fixing process corresponds to the cumulative number of the print medium P to which the composite toner image is fused by the fuser 50 and substantially matches the total number of the sheets printed by the imaging apparatus 1. That is, the cumulative number n of print media subjected to the fixing process is set to 0 for an unused fuser, and is increases (or incremented) by one at each printing process carried out on a print medium P by the imaging apparatus 1. The cumulative number n of the print medium P subjected to the fixing process may be counted by the controller 74 and stored in the storage unit 74*b*. Additionally, the controller 74 may reset the cumulative number n to the initial value when it is determined that the fuser 50 has been replaced.

Figure 4:
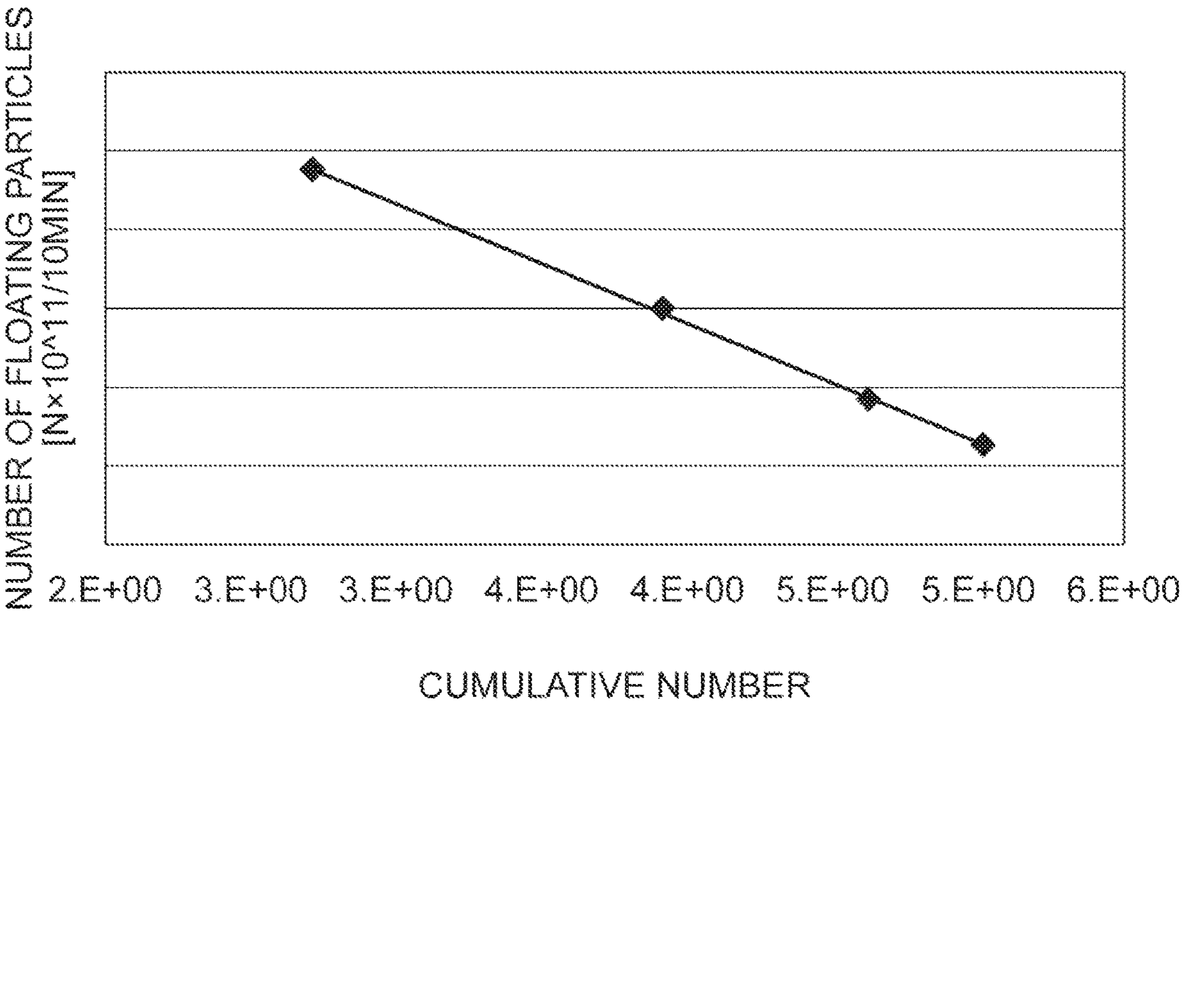
FIG. 4 is a graph of an amount of floating particles relative to a cumulative number of print media subjected to a fixing process.

The number of the floating particles (e.g., an amount of floating particles) 5 generated by the fuser 50 changes according to the cumulative number n of the print medium P subjected to the fixing process. FIG. 4 is a graph showing an example of a relationship between the cumulative number n of the print medium P subjected to the fixing process and the number of floating particles N generated by the fuser 50. As shown in FIG. 4, the number of floating particles N generated by the fuser 50 tends to decrease as the cumulative number n of the print medium P subjected to the fixing process increases. The reason for this is that the fixing process is repeated by the fuser 50 so that the vaporized substance that is a source of the floating particles 5, gradually evaporates and decreases.

At operation ST2, the controller 74 obtains a reference particle number $N_R$ based on the operation history information of the fuser 50. For example, the controller 74 may calculate the reference particle number $N_R$ based on the cumulative number n of the print medium P subjected to the fixing process as shown in the following Equation (1).

$$\text{Reference particle number } N_R = -3.03\times\text{Log [cumulative number } n] + 17.7 \quad \text{Equation (1)}$$

The reference particle number $N_R$ is the operation history parameter obtained from the operation history information of the fuser 50. As shown in Equation (1), the reference particle number $N_R$ can be obtained based on the logarithm of the cumulative number n of the print medium P subjected to the fixing process.

At operation ST3, the controller 74 acquires the print condition of the imaging apparatus 1. Examples of the print condition of the imaging apparatus 1 include the print mode, the thickness of the print medium P, and the operation speed of the fuser 50. The print condition of the imaging apparatus 1 may be stored in the storage unit 74*b* of the controller 74.

Figure 5:
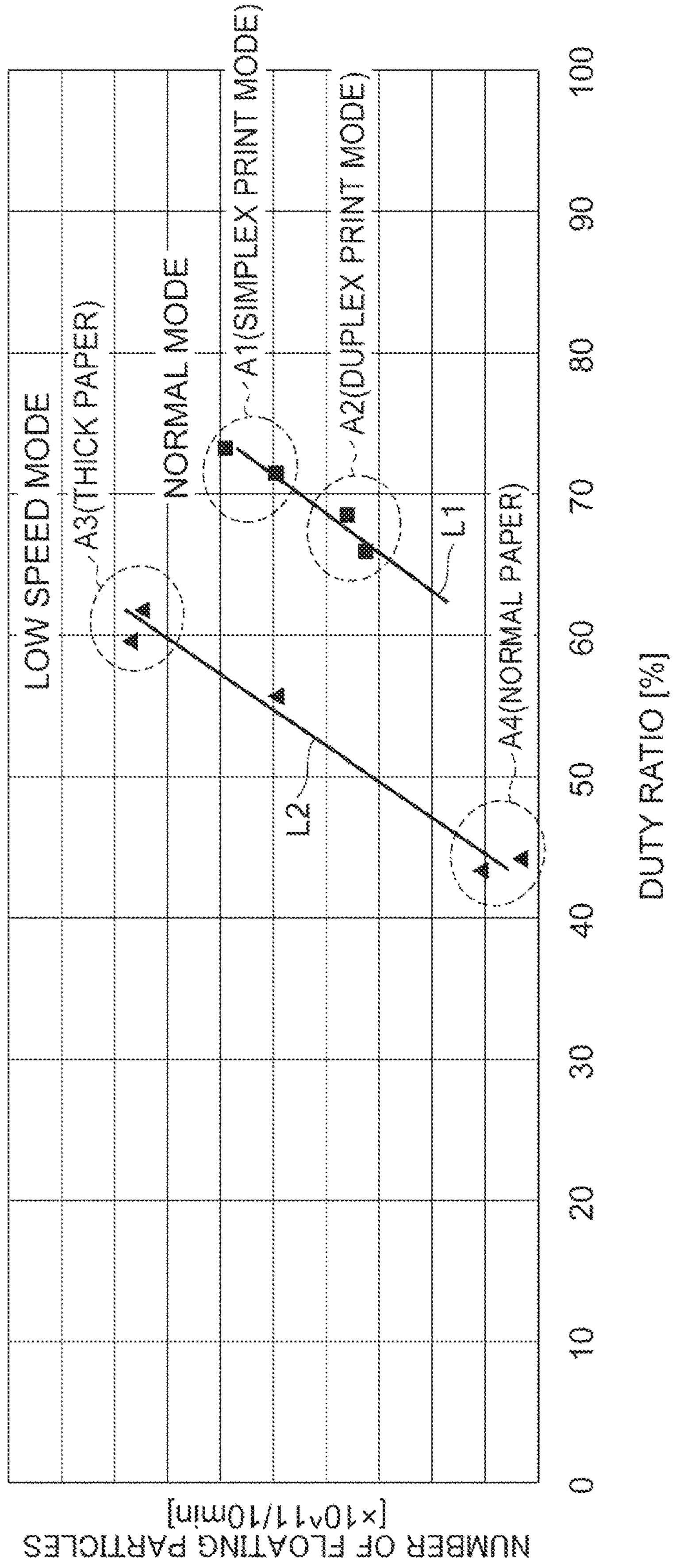
FIG. 5 is a graph of an amount of floating particles relative to a duty ratio of power applied to a fuser.

The number of the floating particles 5 discharged by the fuser 50 also changes depending on the power supplied to the fuser 50. Line L1 of FIG. 5 shows the number of the floating particles 5 discharged into the housing space S relative to the duty ratio of the power applied to the fuser 50, for different print modes of the imaging apparatus 1 in a normal mode of performing a print process at a normal print speed. The duty ratio is a ratio of the time during which power is applied to the fuser 50 in one duty cycle. As the duty ratio increases, the power applied to the fuser 50 increases so that the heat radiation amount of the fuser 50 increases.

With reference to FIG. 5, when the print mode of the imaging apparatus 1 is a simplex print mode (cf. Area A1), the duty ratio of the power applied to the fuser 50 increases and the number of the floating particles 5 discharged into the housing space S increases compared to a case in which the print mode of the imaging apparatus 1 is a duplex print mode (cf. Area A2). In the duplex print mode, the print medium P is heated when a printing process is performed on the front surface, and consequently, the duty ratio of the power applied to the fuser 50 is reduced when a printing process is performed on the back surface. As a result, the number of the floating particles 5 discharged into the housing space S decreases.

In addition, Line L2 of FIG. 5 shows the number of the floating particles 5 discharged into the housing space S relative to the duty ratio of the power applied to the fuser 50, for varying thicknesses of the print medium P in a low speed mode of performing a print process corresponding to a speed lower than that of the normal mode. When the print medium P is thick paper (cf. Area A3), the duty ratio of the power applied to the fuser 50 increases and the number of the floating particles 5 discharged into the housing space S increases compared to a case in which the print medium P is normal paper (cf. Area A4). When the print medium P is thick paper, the amount of heat transferred from the fuser 50 to the print medium P increases, and consequently, the duty ratio of the power for maintaining the temperature of the fuser 50 at a set value increases. As a result, the number of the floating particles 5 discharged into the housing space S increases.

In addition, with reference to Line L1 and Line L2 of FIG. 5, when the print speed of the imaging apparatus 1 corresponds to a low speed mode (cf. Line L2), the duty ratio of the power applied to the fuser 50 decreases and the number of the floating particles 5 discharged by the fuser 50 decreases compared to a case in which the print speed of the imaging apparatus 1 corresponds to a normal mode (cf. Line L1).

As described above, the number of the floating particles 5 discharged into the housing space S changes depending on the power supplied to the fuser 50. In view of this characteristic, the controller 74 determines an exothermic parameter $K_H$ associated with the power supplied to the fuser 50 based on the print condition, at operation ST4.

The controller 74 sets the exothermic parameter $K_H$ to increase as the power supplied to the fuser 50 increases. In some examples, when the imaging apparatus 1 is operated in the simplex print mode, the controller 74 sets the exothermic parameter $K_H$ to be greater than that of the case in which the imaging apparatus 1 is operated in the duplex print mode. For example, the controller 74 may set the exothermic parameter $K_H$ to 1.4 in the simplex print mode and to 1.0 in the duplex print mode.

In addition, when the thickness of the print medium P is relatively thick, the controller 74 sets the exothermic parameter $K_H$ to be greater than that of the case in which the thickness of the print medium P is relatively thin. For example, when the print medium P is thick paper of 157 [g/m$^2$], the exothermic parameter $K_H$ may be set to 7.5. In addition, when the imaging apparatus 1 is operated in the low speed mode, the controller 74 sets the exothermic parameter $K_H$ to be less than that of the case in which the imaging apparatus 1 is operated in the normal speed mode. For example, when the imaging apparatus 1 is operated in the low speed mode, the exothermic parameter $K_H$ may be set to 0.3. Additionally, the controller 74 may determine a multiplication product of a plurality of parameters respectively determined based on the thickness of the print medium P, the print mode of the imaging apparatus 1, and the operation speed of the fuser 50 as the exothermic parameter $K_H$.

At operation ST5, the controller 74 obtains the estimated number $N_E$ of the floating particles 5 based on the operation history information and the exothermic parameter. For example, the controller 74 calculates the estimated number $N_E$ of the floating particles 5 based on the product of the reference particle number $N_R$ and the exothermic parameter $K_H$ as shown in the following Equation (2).

$$\text{Estimated number } N_E \text{ of floating particles} = \text{reference particle number } N_R \times \text{exothermic parameter } K_H \quad \text{Equation (2)}$$

Accordingly, since the reference particle number $N_R$ decreases as the cumulative number n of the print medium P subjected to the fixing process increases, the estimated number $N_E$ of the floating particles increases. Additionally, since the exothermic parameter $K_H$ increases as the thickness of the print medium P increases, the estimated number $N_E$ of the floating particles increases. On the other hand, since the exothermic parameter $K_H$ decreases as the operation speed of the fuser 50 decreases, the estimated number $N_E$ of the floating particles decreases. Further, when the print mode of the imaging apparatus 1 is the duplex print mode, since the exothermic parameter $K_H$ is less than that of the simplex print mode, the estimated number $N_E$ of the floating particles decreases.

At operation ST6, the controller 74 determines the amount of charges to be discharged by the collecting device 70 based on the estimated number $N_E$ of the floating particles 5. For example, the controller 74 may determine the amount of the current flowing between the first electrode 75 and the second electrode 76 based on the operation history information and the power supplied to the fuser 50.

Figure 6:
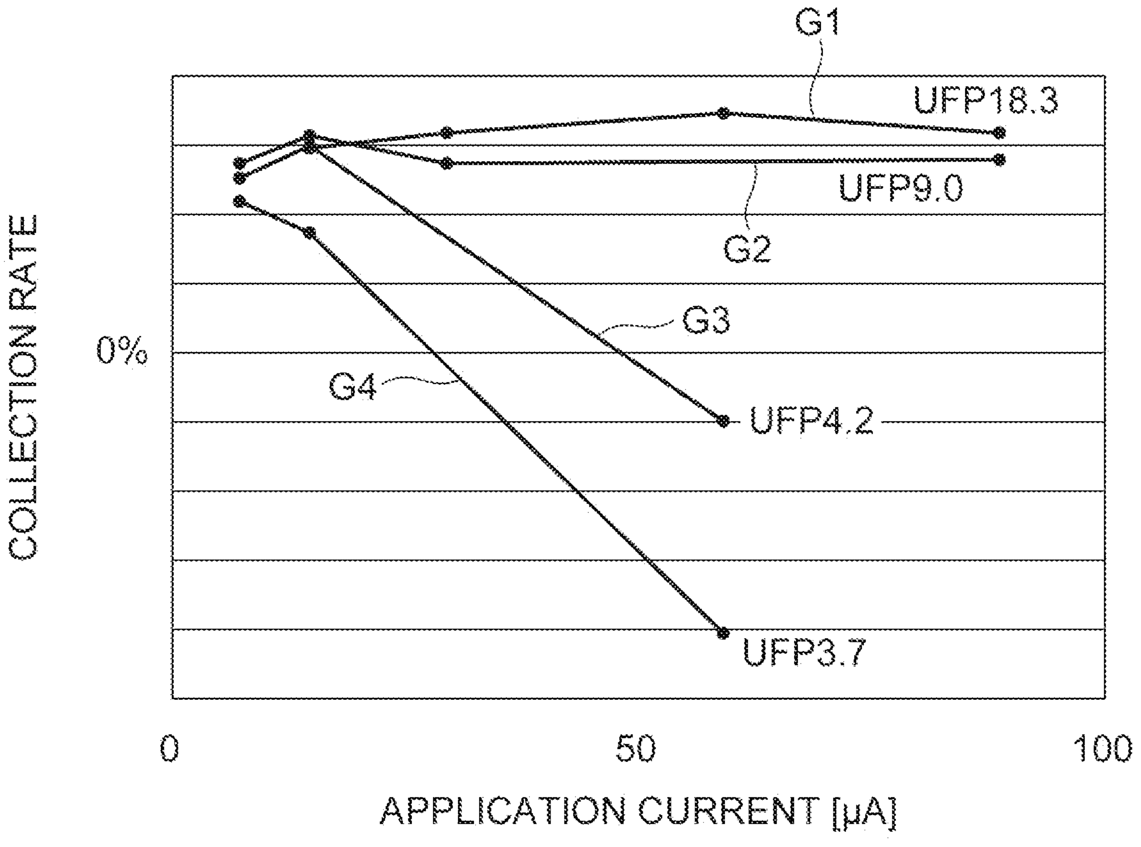
FIG. 6 is a graph of a collection rate of floating particles relative to a current applied to a fuser.

FIG. 6 shows a relationship between the application current to the ionizer 71 of the collecting device 70 and the collection rate of the floating particles 5. The collection rate of the floating particles 5 indicates the ratio of the number of the floating particles 5 decreasing with the operation of the collecting device 70 with respect to the number of floating particles before the operation of the collecting device 70, the positive collection rate indicates that the number of the floating particles 5 inside the housing 2 decreases, and the negative collection rate indicates that the number of the floating particles 5 of the housing 2 increases.

According to FIG. 6, when the number of the floating particles 5 inside the housing 2 is relatively high (cf. Line G1 and Line G2) and a current is applied to the ionizer 71, the collection rate of the floating particles 5 is positive and consequently, the number of the floating particles 5 inside the housing space S decreases. When the number of the floating particles 5 in the housing 2 inside the housing space S is relatively low (cf. Line G3 and Line G4), and the current applied to the ionizer 71 is relatively high (e.g., 20 μA or more), the collection rate is negative and consequently, the number of the floating particles 5 inside the housing space S increases. The floating particles 5 inside the housing space S may be aggregated by Van der Waals force so as to form a single floating particle 5 having a large particle diameter. However, when the floating particles 5 are charged excessively due to charges from the collecting device 70, the floating particles 5 aggregated by the Coulomb force acting between adjacent charges are decomposed into a plurality of floating particles 5 having a small particle diameter and the number of the floating particles 5 may increase. Accordingly, in order to decrease the number of the floating particles 5 inside the housing 2, a suitable amount of charges may be discharged so that the aggregated floating particles 5 are not decomposed.

In view of the above-described characteristics, the controller 74 determines a current value to be applied to the ionizer 71 based on the estimated number $N_E$ of the floating particles. For example, the controller 74 may determine the application current value to the ionizer 71 so that the application current increases in response to an increase in the estimated number $N_E$ of the floating particles 5 by referring to a table in which the number of the floating particles 5 is associated with the current value applied to the ionizer 71. FIG. 7 shows an example reference table in which the number of the floating particles 5 is associated with the current value applied to the ionizer 71.

As described above, the estimated number $N_E$ of the floating particles decreases as the cumulative number n of the print medium P subjected to the fixing process increases. Accordingly, the controller 74 may decrease the amount of the current flowing between the first electrode 75 and the second electrode 76 as the cumulative number n of print medium P increases. In addition, the estimated number $N_E$ of the floating particles increases as the thickness of the print medium P increases. Accordingly, the controller 74 may increase the amount of the current flowing between the first electrode 75 and the second electrode 76 when the print medium P is thicker than a previous print medium on which the printing process has been carried. Additionally, the estimated number $N_E$ of the floating particles decreases as the operation speed of the fuser 50 decreases. Accordingly, the controller 74 may decrease the amount of the current flowing between the first electrode 75 and the second electrode 76 when the operation speed of the fuser 50 is decreased. In addition, the estimated number $N_E$ of the floating particles is less when the print mode of the imaging apparatus 1 is the duplex print mode, than in the case of the simplex print mode. Accordingly, the controller 74 may decrease the amount of the current flowing between the first electrode 75 and the second electrode 76 when the imaging apparatus 1 is switched from the simplex print mode to the duplex print mode.

At operation ST7, the controller 74 executes the print process. At operation ST8, the controller 74 applies a current to the ionizer 71 so that charges are discharged by the amount determined at operation ST6 by controlling the collecting device 70. Accordingly, the floating particles 5 generated inside the housing space S due to the print process are charged by charges discharged from the collecting device 70. The charged floating particles 5 move due to the air flow 7 generated by the exhaust fan 73, and are collected by the particle filter 72. Consequently, the floating particles 5 discharged from the imaging apparatus 1 are decreased. In addition, the controller 74 can increase the current to be applied to the ionizer 71 in accordance with an increase in the estimated number $N_E$ of the floating particles 5, in order to extend the life of the ionizer 71.

At operation ST9, when the print process is completed, the controller 74 ends the print process, and at operation ST10, the controller 74 stops the application of the current to the ionizer 71.

Figure 8:
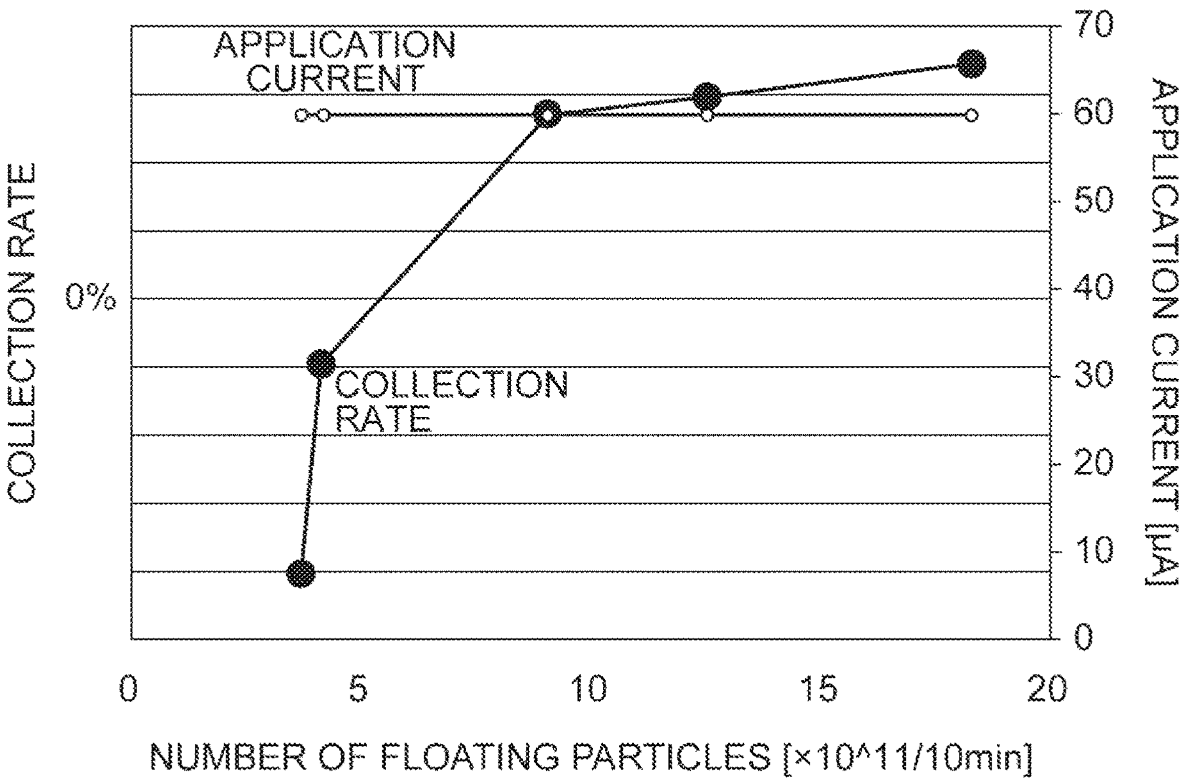
FIG. 8 is a graph of a collection rate obtained relative to an amount of floating particles in an example imaging apparatus.
Figure 9:
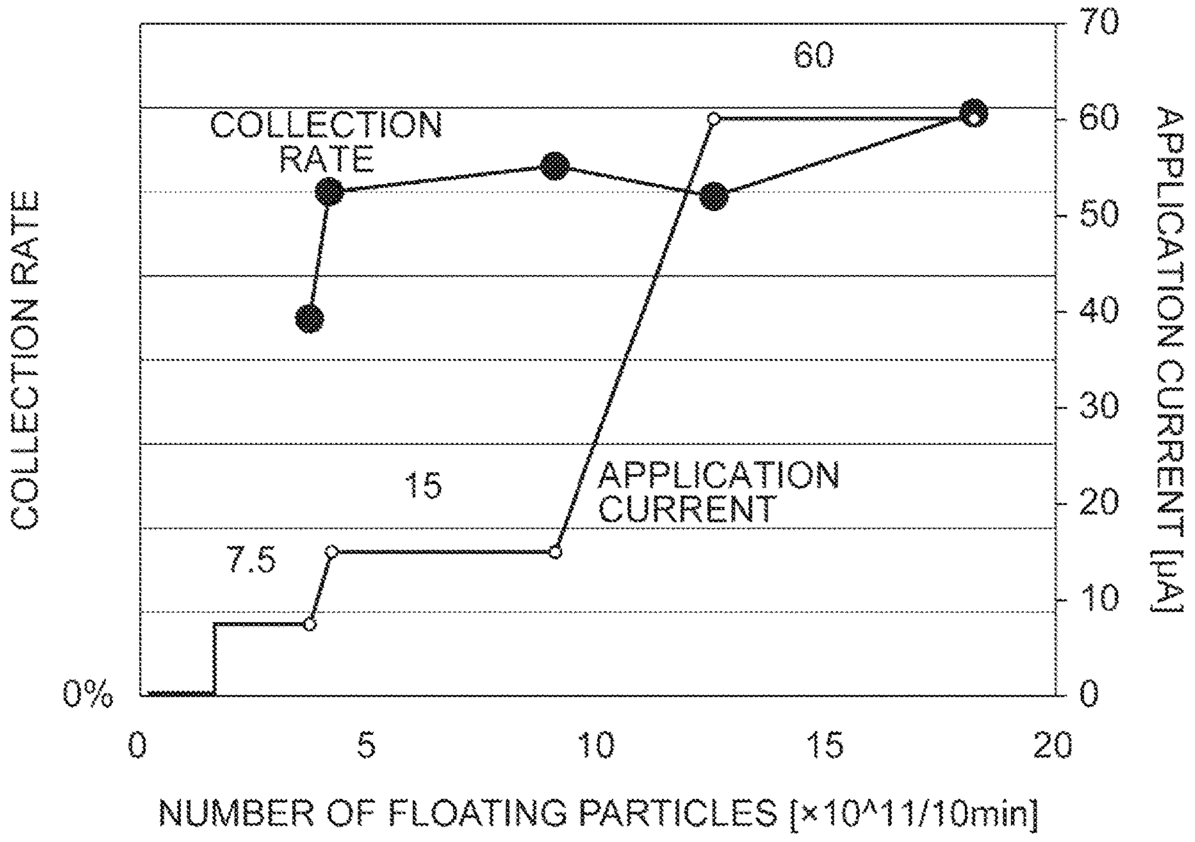
FIG. 9 is a graph of a collection rate obtained relative to an amount of floating particles in an example imaging apparatus.

With reference to FIGS. 8 and 9, operational effects of the example imaging apparatus 1 will be described in comparison with another example.

FIG. 8 shows the collection rate of the floating particles 5 obtained with an example imaging apparatus. The collection rate of the floating particles was evaluated when a constant current was applied to an ionizer of the imaging apparatus, regardless of the number of the floating particles inside a housing space of the imaging apparatus. FIG. 9 shows the collection rate of the floating particles 5 obtained with the above-described example imaging apparatus 1. The estimated number $N_E$ of the floating particles 5 inside the housing space S was obtained based on the reference particle number $N_R$ and the exothermic parameter $K_H$, and the collection rate of the floating particles 5 was evaluated when the current applied to the ionizer 71 was controlled to increase in response to an increase in the estimated number $N_E$ of the floating particles 5 based on the table shown in FIG. 7.

Based on FIG. 8, it was observed that when the application current of the ionizer was constant, the collection rate of the floating particles was negative, in that the number of the floating particles increased, when the number of the floating particles inside the housing space was relatively low. This phenomenon is considered to be due to the fact that the amount of charges released from the ionizer becomes excessive and the aggregated floating particles are decomposed into a plurality of floating particles. In the example imaging apparatus 1, with reference to FIG. 9, it was observed that when the current applied to the ionizer 71 was controlled to increase stepwise (e.g., incrementally) according to an increase in the estimated number $N_E$ of the floating particles 5, the floating particles 5 could be collected at a relatively high collection rate regardless of the number of the floating particles 5 inside the housing 2.

It will be appreciated that the above-described examples may be modified in various ways.

Figure 10:
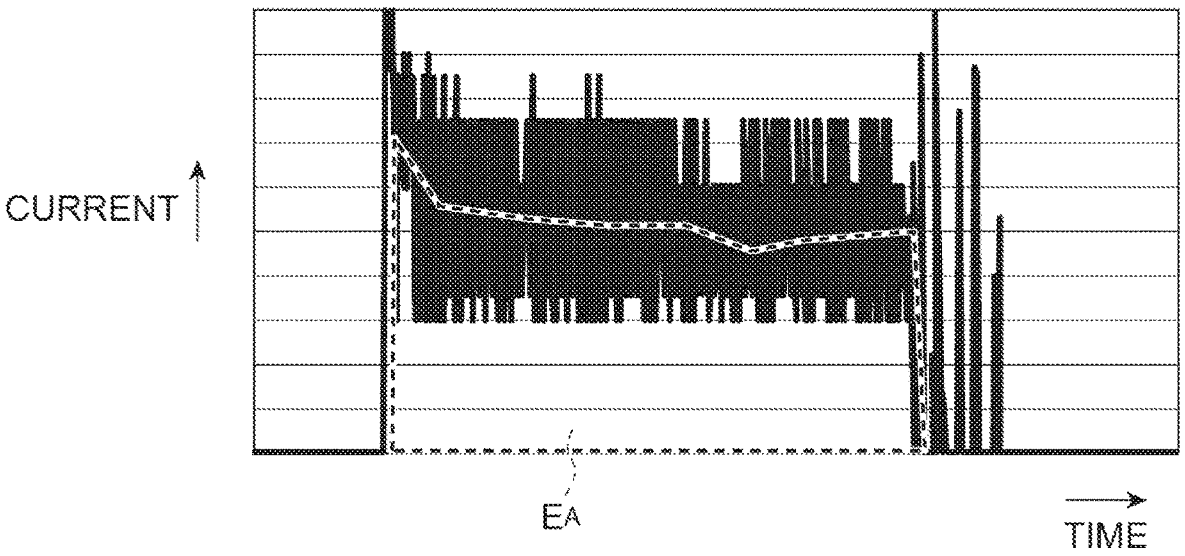
FIG. 10 is a graph showing an example history of a current applied to a fuser over time.

For example, in some of the above-described examples, the controller 74 obtains the estimated number $N_E$ of the floating particles 5 by using the cumulative number n of print media subjected to the fixing process as the operation history information. In other examples, the estimated number $N_E$ of the floating particles 5 may be obtained by using the cumulative power supplied to the fuser 50. FIG. 10 shows an example of a history of the current value applied to the fuser 50. The controller 74 may obtain the cumulative power $E_A$ (the area outlined by a dashed line in FIG. 10) based on the history of the current value supplied to the fuser 50 and obtain the estimated number $N_E$ of the floating particles 5 based on the cumulative power $E_A$. Similarly to the cumulative number n of the print medium P subjected to the fixing process using the fuser 50, since the number of the floating particles 5 generated by the fuser 50 changes due to the cumulative power $E_A$ supplied to the fuser 50, the estimated number $N_E$ of the floating particles 5 can be obtained based on the cumulative power $E_A$ supplied to the fuser 50.

For example, the number of the floating particles 5 generated by the fuser 50 decreases as the cumulative power $E_A$ supplied to the fuser 50 increases. Thus, the controller 74 may decrease the amount of the current flowing between the first electrode 75 and the second electrode 76 as the cumulative power $E_A$ increases. In addition, the data measured by the energy measuring unit 55 may be used as the cumulative power $E_A$. The controller 74 may reset the cumulative power $E_A$ to the initial value when it is determined that the fuser 50 has been replaced.

In other examples, the temperature of the fuser 50 measured by the temperature measuring unit 56 or the cumulative usage time of the imaging apparatus 1 may be used as the operation history information to obtain the estimated number $N_E$ of the floating particles 5.

In addition, although the estimated number $N_E$ of the floating particles 5 may be obtained in some example based on the operation history information (for example, the cumulative number n or the cumulative power $E_A$) and the exothermic parameter $K_H$, in other examples, the estimated number $N_E$ of the floating particles 5 may be obtained without using the exothermic parameter $K_H$. For example, for an example imaging apparatus that is not operable in a duplex print mode or in a low speed mode, the estimated number $N_E$ of the floating particles 5 may be obtained based on the operation history information with the exothermic parameter $K_H$ being a constant value.

In addition, although the exothermic parameter $K_H$ may be acquired based on the print mode, the thickness of the print medium, and the operation speed of the fuser according to some examples, the exothermic parameter $K_H$ may be obtained in other examples, by using at least one parameter associated with the power supplied to the fuser 50.

In addition, although the amount of the current flowing between the first electrode 75 and the second electrode 76 may be decreased when determining that the operation speed of the fuser 50 is slower (e.g., operating in low speed mode) according to some examples, in other example, the amount of the current flowing between the first electrode 75 and the second electrode 76 may be decreased by determining that the operation speed of the fuser 50 is slower, when a control is performed to reduce the passing speed of the print medium P in the fuser 50, to limit the number of continuous printings, or to extend an interval time between print jobs.

Although the collecting device 70 including the ionizer 71, the particle filter 72, the exhaust fan 73, and the controller 74 has been described according to examples, the collecting device 70 may have other suitable configurations or features so that charges are discharged into the housing space S so as to charge and collect the floating particles 5. In addition, although the collecting device 70 includes the controller 74 according to examples, the controller 74 may be a controller that controls the entire imaging apparatus 1 according to other examples.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. An imaging system comprising:
- a housing that defines a housing space;
- a fuser disposed inside the housing space to fix a toner image onto a print medium
- a collecting device including an ionizer having a first electrode and a second electrode, and a particle filter, the ionizer to generate a discharge between the first electrode and the second electrode in order to charge floating particles discharged from the fuser, and the particle filter to collect the charged floating particles; and
- a controller to control a current to flow between the first electrode and the second electrode due to the discharging, based on operation history information of the fuser and power supplied to the fuser.

2. The imaging system according to claim 1, wherein the operation history information of the fuser includes a cumulative number of print media processed by the fuser, and
- wherein the controller is further to decrease the current to flow between the first electrode and the second electrode as the cumulative number increases.

3. The imaging system according to claim 1,
- wherein the operation history information of the fuser includes a cumulative power supplied to the fuser, and
- wherein the controller is further to decrease the current to flow between the first electrode and the second electrode as the cumulative power increases.

4. The imaging system according to claim 1, wherein the controller is further to increase the current to flow between the first electrode and the second electrode as a thickness of the print medium increases.

5. The imaging system according to claim 1, wherein the controller is further to decrease the current to flow between the first electrode and the second electrode based on the imaging system operating in a duplex print mode, as compared with a case in which the imaging system is operating in a simplex print mode.

6. The imaging system according to claim 1, wherein the controller is further to decrease the current to flow between the first electrode and the second electrode as an operation speed of the fuser decreases.

7. The imaging system according to claim 2, wherein the controller is further to reset the cumulative number to an initial value based on a replacement of the fuser.

8. The imaging system according to claim 3, wherein the controller is further to reset a cumulative power to an initial value based on a replacement of the fuser.

9. A controller for an imaging system including a housing and a fuser located in the housing, the controller comprising controller-executable data and instructions to:
- control a current to flow between a first electrode and a second electrode located in the housing based on operation history information of the fuser and power supplied to the fuser.

10. The controller according to claim 9,
- wherein the operation history information of the fuser includes a cumulative number of print media processed by the fuser, and wherein the controller-executable data and instructions are further to reduce the current to flow between the first electrode and the second electrode as the cumulative number increases.

11. The controller according to claim 9, wherein the operation history information of the fuser includes a cumulative power supplied to the fuser, and wherein the controller-executable data and instructions are further to reduce the current to flow between the first electrode and the second electrode as the cumulative power increases.

12. The controller according to claim 9, wherein the controller-executable data and instructions are further to increase the current to flow between the first electrode and the second electrode as a thickness of a print medium processed by the fuser increases.

13. The controller according to claim 9, wherein the imaging system is operable in a simplex print mode and in a duplex print mode, and wherein the controller-executable data and instructions are further to set the current to flow between the first electrode and the second electrode in the duplex print mode to be less than in the simplex print mode.

14. The controller according to claim 9, wherein the controller-executable data and instructions are further to reduce the current to flow between the first electrode and the second electrode as an operation speed of the fuser decreases.

* * * * *